(12) United States Patent
Ohno et al.

(10) Patent No.: US 8,110,275 B2
(45) Date of Patent: Feb. 7, 2012

(54) MIXED PARTICLES AND HONEYCOMB STRUCTURE FOR GAS CONVERSION APPARATUS

(75) Inventors: Kazushige Ohno, Gifu (JP); Takahiko Ido, Gifu (JP); Yoshihiro Koga, Gifu (JP); Yuji Akema, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 735 days.

(21) Appl. No.: 11/928,546

(22) Filed: Oct. 30, 2007

(65) Prior Publication Data

US 2008/0241467 A1 Oct. 2, 2008

(30) Foreign Application Priority Data

Mar. 30, 2007 (WO) .................. PCT/JP2007/057257

(51) Int. Cl.
*B32B 3/12* (2006.01)
*B32B 3/00* (2006.01)
*B01J 21/00* (2006.01)
*C04B 35/00* (2006.01)

(52) U.S. Cl. ....... 428/116; 428/34.5; 502/100; 501/153; 501/154

(58) Field of Classification Search .................. None
See application file for complete search history.

(56) References Cited

U.S. PATENT DOCUMENTS

| | | | | |
|---|---|---|---|---|
| 4,888,317 A | * | 12/1989 | DeAngelis et al. | 502/60 |
| 6,261,989 B1 | | 7/2001 | Tanaka et al. | |
| 6,306,794 B1 | * | 10/2001 | Suzuki et al. | 502/304 |
| 6,413,904 B1 | * | 7/2002 | Strehlau et al. | 502/328 |
| 7,550,117 B2 | * | 6/2009 | Alward et al. | 422/177 |
| 7,572,416 B2 | * | 8/2009 | Alward et al. | 422/180 |
| 2003/0224931 A1 | * | 12/2003 | Yamamoto et al. | 502/304 |
| 2006/0216466 A1 | * | 9/2006 | Yoshida | 428/116 |
| 2008/0118701 A1 | | 5/2008 | Ohno et al. | |
| 2008/0119355 A1 | | 5/2008 | Ohno et al. | |
| 2008/0176028 A1 | | 7/2008 | Ohno et al. | |
| 2008/0187713 A1 | | 8/2008 | Ohno et al. | |
| 2008/0241003 A1 | | 10/2008 | Ido et al. | |
| 2008/0241005 A1 | | 10/2008 | Ido et al. | |

(Continued)

FOREIGN PATENT DOCUMENTS

CN 1791564 6/2006

(Continued)

OTHER PUBLICATIONS

Chinese Office Action for corresponding CN Application No. 200780028904.3, Oct. 13, 2010.

*Primary Examiner* — David Sample
*Assistant Examiner* — Nicole Gugliotta
(74) *Attorney, Agent, or Firm* — Ditthavong Mori & Steiner, P.C.

(57) ABSTRACT

Mixed particles including noble metal particles of a noble metal, first particles of one or more metal oxides, and second particles of a metal oxide. The first particles of one or more metal oxides are selected from $Al_2O_3$, $SiO_2$, $ZrO_2$ and $TiO_2$. The second particles of a metal oxide have a larger adsorptive interaction with the noble metal of the noble metal particles as compared with the metal oxide of the first particles. The noble metal particles are carried by the second particles in a larger proportion than by the first particles.

16 Claims, 4 Drawing Sheets

U.S. PATENT DOCUMENTS

2008/0241008 A1 10/2008 Ido et al.
2008/0260991 A1 10/2008 Konstandopoulos et al.

FOREIGN PATENT DOCUMENTS

| | | |
|---|---|---|
| EP | 0558159 | 9/1993 |
| EP | 1121979 | 8/2001 |
| EP | 1174174 | 1/2002 |
| JP | 2006-043654 | 2/2006 |
| JP | 2006-043683 | 2/2006 |
| JP | 2006-068665 | 3/2006 |
| JP | 2007-000795 | 1/2007 |
| WO | WO 2006/016633 | 2/2006 |
| WO | WO 2006/025613 | 3/2006 |

* cited by examiner

20nm

MIXED PARTICLES AND HONEYCOMB STRUCTURE FOR GAS CONVERSION APPARATUS

CROSS-REFERENCE TO RELATED APPLICATIONS

The present application claims priority to PCT Application No. PCT/JP2007/057257, filed on Mar. 30, 2007, which entire contents of which are incorporated herein by reference in their entirety.

BACKGROUND OF THE INVENTION

1. Field of the Invention

The present invention relates to conversion of gases, for example, the conversion of exhaust gases from an internal combustion engine.

2. Discussion of the Background

Various proposals have been made with regard to exhaust gas converting apparatuses that use a honeycomb structure of porous ceramic as the carrier of catalyst that is used for converting the exhaust gas emitted from an internal combustion engine of vehicles such as buses and trucks, construction machines, or the like. Such a carrier of catalyst supports thereon a noble metal catalyst of platinum (Pt), rhodium (Rh), palladium (Pd), or the like, by interposing a catalyst carrier layer of oxide such as $\gamma$-$Al_2O_3$ (alumina). It has been generally practiced in the art to use $\gamma$-alumina for the catalyst carrier layer for increasing the specific surface area, while there are proposals these days to use $\gamma$-$Al_2O_3$ (alumina) in combination with a material such as ceria ($CeO_2$), zirconia ($ZrO_2$), titania ($TiO_2$), or the like, for facilitating conversion of exhaust gas by using the chemical nature of the carrier.

Because of large adsorptive interaction with platinum supported thereon, it is known, particularly, that ceria can provide the effect of suppressing sintering (grain growth) of platinum. It should be noted that, when there is caused sintering in platinum while the catalyst carrier is being used for the exhaust gas converting apparatus, a decrease in the specific surface area of platinum is caused, and hence a decrease in active sites. This leads to degradation of exhaust gas converting power of the catalyst. On the other hand, ceria has the nature of causing sintering relatively easily, and thus, there are cases in which platinum supported upon ceria undergoes sintering together with the sintering of the ceria.

Japanese Laid-Open Patent Application 2006-43683A describes an exhaust gas converting catalyst having a catalyst carrier in which primary particles of ceria and primary particles of alumina are mixed with each other and platinum is supported upon this catalyst carrier. This catalyst carrier is obtained by a process of forming a mixed sol of a ceria sol and an alumina sol, forming a coagulation product by causing coagulation of the ceria sol and alumina sol from the mixed sol, and drying and firing the obtained coagulation product. The entire contents of Japanese Laid-Open Patent Application 2006-43683A are incorporated herein by reference.

SUMMARY OF THE INVENTION

According to an aspect of the present invention, there is provided mixed particles including: noble metal particles of a noble metal; first particles of one or more metal oxides selected from the group consisting of $Al_2O_3$, $SiO_2$, $ZrO_2$ and $TiO_2$; and second particles of a metal oxide having a larger adsorptive interaction with the noble metal as compared with the metal oxide of the first particles. The noble metal particles are supported by the second particles in a larger proportion or number than by the first particles.

According to an embodiment of the present invention, each of the first and second particles of the mixed particles is a secondary particle.

According to an embodiment of the present invention, the first particles have an average particle diameter larger than an average particle diameter of the second particles in the mixed particles, the first particles having an average particle diameter of about 0.5 to about 2 µm, the second particles having an average particle diameter of about 0.1 to about 1 µm.

According to an embodiment of the present invention, the first particles of the mixed particles are primary particles and the second particles of the mixed particles are secondary particles.

According to an embodiment of the present invention, the second particles of the mixed particles have an average particle diameter of about 5 to about 50 nm.

According to an embodiment of the present invention, the first particles of the mixed particles are formed of $Al_2O_3$ and the second particles of the mixed particles are formed of $CeO_2$.

According to the present invention, the noble metal particles in the mixed particles are formed of Pt.

According to an embodiment of the present invention, a weight ratio of the second particles to the first particles is about 0.05 to about 3.0 in the mixed particles.

According to an embodiment of the present invention, the mixed particles have an average particle diameter of about 1 to about 5 µm.

In another aspect of the present invention, there is provided a honeycomb structure in which plural cells having a hole therein are arranged side by side in a longitudinal direction thereof, wherein the honeycomb structure contains any of the mixed particles noted above.

According to an embodiment of the present invention, the mixed particles are held in the honeycomb structure by a compartment wall separating the holes of adjacent cells.

According to an embodiment of the present invention, the mixed particles in the mixed particles are added to a raw material paste.

According to an embodiment of the present invention, the honeycomb structure supports a catalyst of any of an alkali metal, an alkali earth metal and an oxide.

According to an embodiment of the present invention, the first particles have an average particle diameter larger than an average particle diameter of the second particles in the honeycomb structure, the first particles having an average particle diameter of about 0.5 to about 2 µm, the second particles having an average particle diameter of about 0.1 to about 1 µm.

According to an embodiment of the present invention, the first particles of the honeycomb structure are primary particles and the second particles of the mixed particles are secondary particles.

According to an embodiment of the present invention, the second particles of the honeycomb structure have an average diameter of about 5 to about 50 nm.

According to an embodiment of the present invention, the first particles of the honeycomb structure are formed of $Al_2O_3$ and the second particles of the mixed particles are formed of $CeO_2$.

According to the present invention, the noble metal particles in the honeycomb structure are formed of Pt.

According to an embodiment of the present invention, a weight ratio of the second particles to the first particles is about 0.05 to about 3.0 in the honeycomb structure.

According to an embodiment of the present invention, the honeycomb structure has an average particle diameter of about 1 to about 5 μm.

According to an embodiment of the present invention, honeycomb units are joined to each other by interposing an adhesive layer in the honeycomb structure, where the honeycomb unit is produced by using a raw material paste containing the mixed particles, inorganic fibers and/or whiskers, and an inorganic binder.

According to an embodiment of the present invention, the inorganic fibers and/or whiskers include: alumina; silica; silicon carbide; silica-alumina; glass; potassium titanate; or aluminum borate.

According to an embodiment of the present invention, the inorganic binder includes an inorganic sol or a clay binder.

According to an embodiment, the inorganic binder includes alumina sol, silica sol, titania sol, water glass, sepiolite, or atapalgite.

BRIEF DESCRIPTION OF THE DRAWINGS

A more complete appreciation of the invention and many of the attendant advantages thereof will be readily apparent with reference to the following detailed description when considered in connection with the accompanying drawings, wherein.

DETAILED DESCRIPTION OF THE PREFERRED EMBODIMENT

Figure 1A:
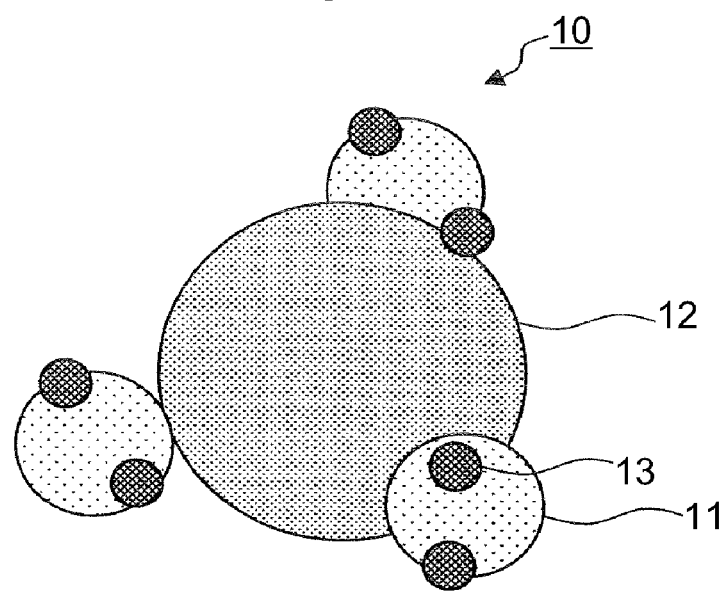
FIG. 1A is a schematic cross-sectional diagram showing an example of the mixed particles according to an embodiment of the present invention.

Next, the best mode for implementing the present invention will be. The various embodiments of the present invention will be described with reference to the accompanying drawings, wherein like reference numerals designate corresponding or identical elements throughout the various drawings.

The present invention provides an embodiment of mixed particles that include: noble metal particles of a noble metal; first particles of one or more metal oxides selected from the group consisting of $Al_2O_3$, $SiO_2$, $ZrO_2$ and $TiO_2$; and second particles of a metal oxide having a larger adsorptive interaction with the noble metal of the noble metal particles as compared with the metal oxide of the first particles. Here, the noble metal particles are carried in greater proportion by the second particles than by the first particles. For the noble metal of the noble metal particles, platinum, palladium, rhodium, and the like are listed, wherein two or more of these metals may be used at the same time. With this, it becomes easier to suppress the sintering of platinum.

However, with the exhaust gas converting catalyst of JP2006-43683A, most of platinum is supported by alumina in view of the fact that the platinum is carried upon a mixture obtained by mixing the primary particles of ceria and the primary particles of alumina. Thus, there are problems that the platinum supported upon the primary particles of alumina tends to cause sintering.

According to the embodiment of the present invention, it becomes possible to obtain mixed particles and a honeycomb structure capable of suppressing sintering of platinum.

In the embodiment of the present invention, the adsorptive interaction with noble metal means adsorption energy to the noble metal. Table 1 lists various adsorption energies of Pt and a metal oxide as an example of computer simulation.

TABLE 1

| Metal oxide | Adsorption energy of Pt to metal oxide [kcal/mol] |
| --- | --- |
| $CeO_2$ | −113.185 |
| $ZrO_2$ | −104.274 |
| $La_2O_3$ | −104.185 |
| BaO | −82.680 |
| $Al_2O_3$ | −68.551 |
| $TiO_2$ | −34.149 |
| $SiO_2$ | −8.695 |

The smaller the adsorption energy, and thus the larger the negative value of the adsorption energy, the larger the adsorptive interaction becomes.

Figure 1B:
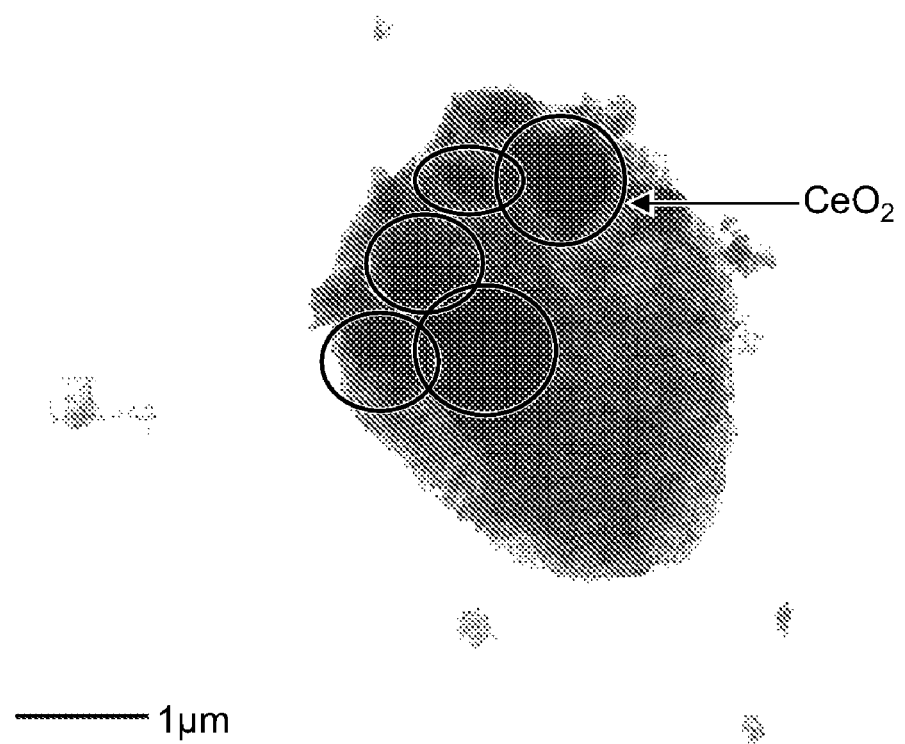
FIG. 1B is a SEM photograph showing an example of mixed particles according to an embodiment of the present invention.

FIGS. 1A and 1B show an example of the mixed particles according to an embodiment of the present invention. A mixed particle 10 includes secondary particles 11 of $CeO_2$ and secondary particles 12 of $Al_2O_3$. While Pt 13 are supported by the secondary particles 11 of $CeO_2$, the secondary particles 11 of $CeO_2$ are mixed with the secondary particles 12 of $Al_2O_3$ in the dispersed state, and thus, it becomes easier to suppress the sintering of the $CeO_2$ secondary particles 11. Further, because of large adsorptive interaction between the secondary particles 11 of $CeO_2$ and Pt 13, it becomes also easier to suppress the sintering of Pt supported by the secondary particles 11 of $CeO_2$. Here, it should be noted that the secondary particles 12 of $Al_2O_3$ have larger average diameter than the secondary particles 11 of $CeO_2$. With this, it is becomes easier to effectively suppress the sintering of the secondary particles 11 of $CeO_2$. Here, it is preferable that the secondary particles 11 of $CeO_2$ have an average particle diameter of about 0.1 to about 1 μm and the secondary particles 12 of $Al_2O_3$ have an average particle diameter of about 0.5 to about 2 μm.

In the present invention, average particle diameter is measured by microscopic observation conducted by using scanning electron microscope (SEM), transmission electron microscope (TEM), or the like.

Figure 2A:
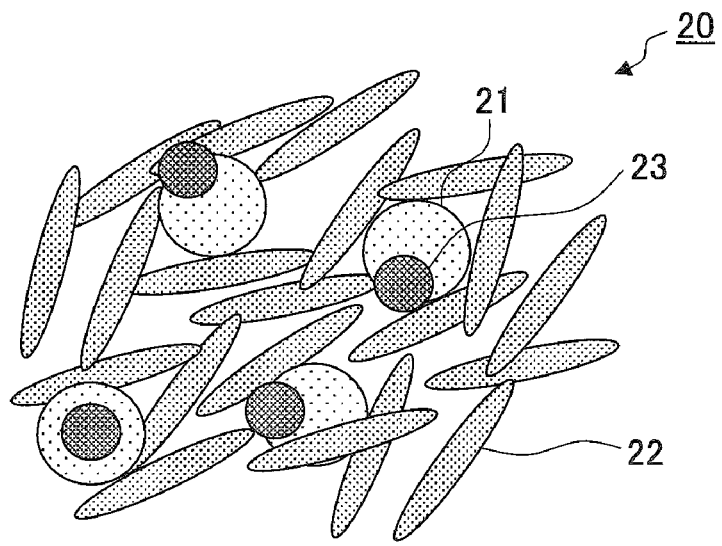
FIG. 2A is a schematic, cross-sectional diagram showing another example of the mixed particles according to an embodiment of the present invention.
Figure 2B:
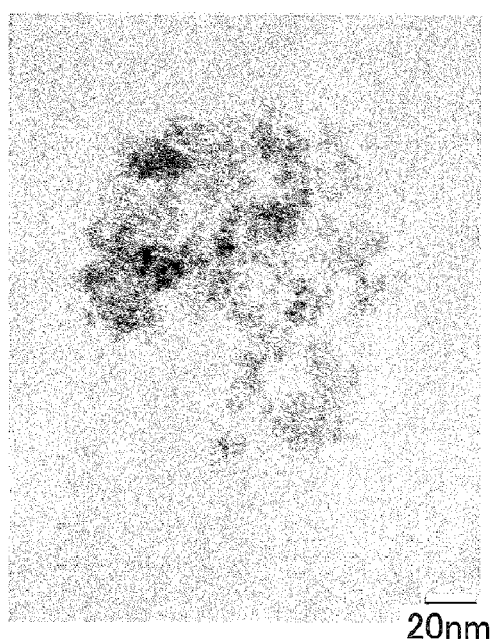
FIG. 2B is a SEM photograph showing another example of the mixed particles according to an embodiment of the present invention.

FIGS. 2A and 2B show another example of the catalyst according to the embodiment of the present invention. A catalyst 20 includes secondary particles 21 of $CeO_2$ and primary particles 22 of $Al_2O_3$. While Pt 23 are supported by the secondary particles 21 of $CeO_2$, there exists large adsorptive interaction between the secondary particles 21 of $CeO_2$ and the Pt 23, and thus, it becomes easier to suppress the sintering of the Pt 23 supported by the secondary particles 21 of $CeO_2$. Further, because the secondary particles 21 of $CeO_2$ and the primary particles 22 of $Al_2O_3$ are mixed with each other in a dispersed state, it becomes easier to suppress the sintering of the secondary particles 21 of $CeO_2$. Here, it is preferable that the secondary particles 21 of $CeO_2$ have an average particle diameter of about 5 to about 50 nm.

While FIGS. 1B and 2B show a SEM photograph and a TEM photograph, respectively, it is possible to identify the particles by carrying out element analysis.

Preferably, the mixed particles of the present invention have a weight ratio for the second particles to the first particles of about 0.05 to about 3.0.

Further, it is preferable with the mixed particles of the present invention to have an average particle diameter of about 1 to about 5 μm in the event the mixed particles are used in the form added to a raw material paste as will be explained later.

According the present invention, the mixed particles are manufactured by the steps of: causing particles of $CeO_2$ to support Pt thereon; dispersing the particles of $CeO_2$ supporting the Pt thereon in a dispersing medium; dispersing particles of $Al_2O_3$ further into the dispersing medium in which the particles of $CeO_2$ carrying thereon the Pt are dispersed; and carrying out granulation while using the dispersing medium in which the particles of $Al_2O_3$ are dispersed. More specifically, Pt is carried by the secondary particles of $CeO_2$ (average particle diameter about 5 μm) while using a solution of dinitroamine platinum, and fixed thereupon by heating at about 600° C. under a reducing atmosphere. Next, the secondary particles of $CeO_2$ supporting thereon Pt may be dispersed according to the needs in a dispersing medium such as water in which dispersant such as surfactant is added. Further, the secondary particles of $Al_2O_3$ (average particle diameter about 2 μm) are dispersed into the dispersing medium and mixed. Next, the obtained dispersion liquid is used for granulation, and with this, the mixed particles according to the embodiment of the present invention are obtained.

With the honeycomb structure according to an embodiment of the present invention, there are arranged a plurality of cells having a hole side by side in a longitudinal direction thereof, wherein the mixed particles according to the embodiment of the present invention are included. Thereby, the mixed particles may be supported by a compartment wall separating holes of adjacent cells. With this, it becomes easier to suppress the sintering of platinum.

Figure 3:
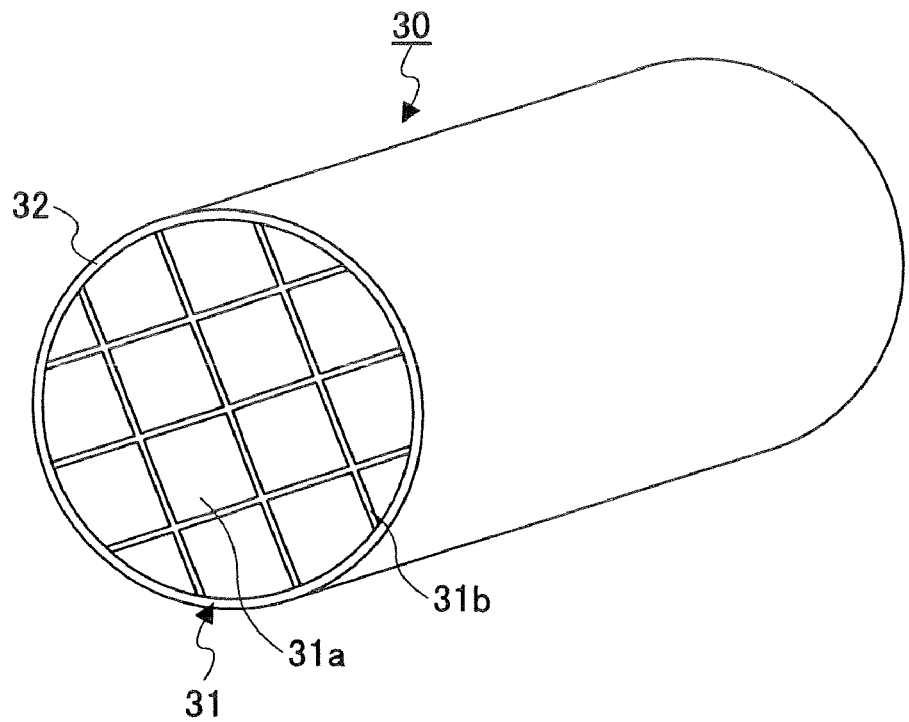
FIG. 3 is an oblique view diagram showing an example of honeycomb structure according to an embodiment of the present invention.
Figure 4A:
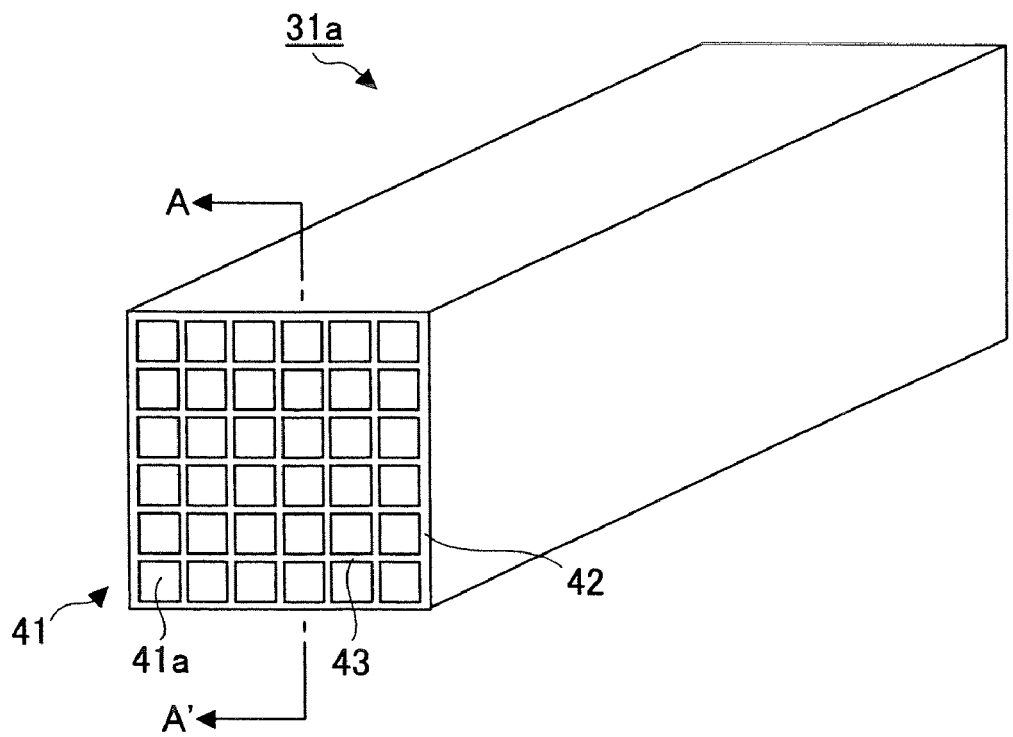
FIG. 4A is an oblique view diagram showing the honeycomb unit of FIG. 3.

FIG. 3 shows an example of the honeycomb structure according to the embodiment of the present invention. Further, FIG. 4A shows an example of the honeycomb unit constituting the fundamental unit of the honeycomb structure of FIG. 3. Further, FIG. 4B shows the cross-section taken along a line A-A' of FIG. 4A schematically.

As shown in FIG. 3, the honeycomb structure 30 is formed by joining honeycomb units 31a of rectangular pillar shape shown in FIG. 4A by interposing an adhesive layer 31b, followed by cutting the peripheral part thereof partially. Further, a coating layer 32 is provided on the outer periphery of the honeycomb block 31 of cylindrical shape. While the honeycomb structure 30 and the honeycomb block 31 have a cylindrical shape, there is no limitation with regard to the shape thereof as long as it has a pillar shape. Thus, the honeycomb structure 30 and the honeycomb block 31 may have a pillar shape of elliptical cross-section or rectangular cross-section, etc. Similarly, there is no limitation with regard to the shape of the honeycomb unit 31a.

Figure 4B:
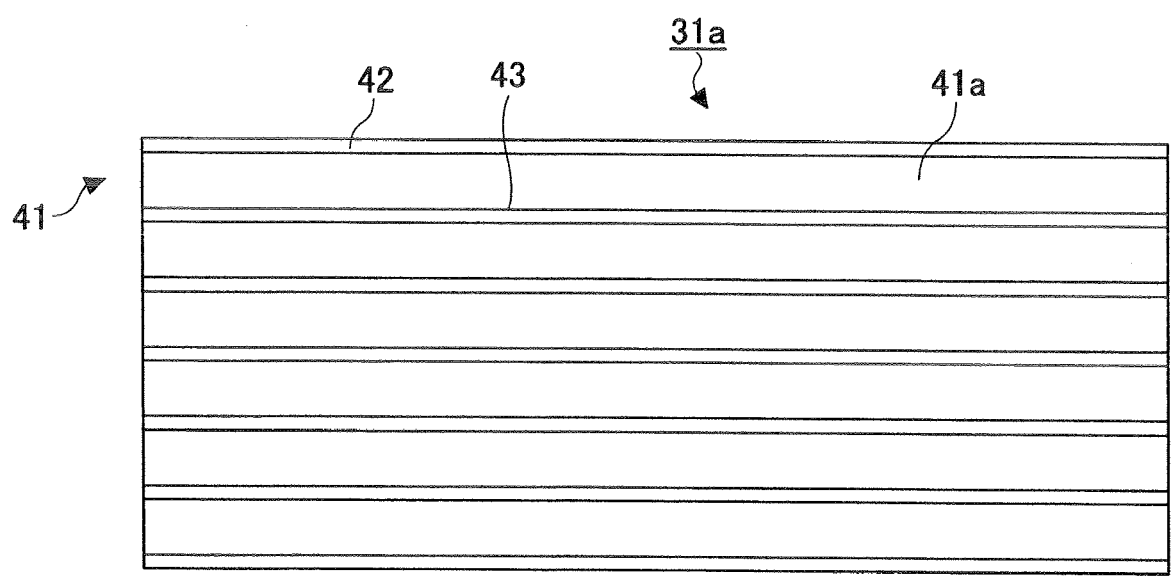
FIG. 4B is a cross-sectional diagram showing the honeycomb unit of FIG. 3.

As shown in FIGS. 4A and 4B, there are provided, in the honeycomb unit 31a, a plurality of cells 41 having a penetrating hole 41a and extending in a longitudinal direction, in a manner arranged side by side. Here, it should be noted that the honeycomb unit 31a has an outer wall 42a at an outer edge thereof, and there is provided an adjacent cell 41 having a penetrating hole 41a in a manner separated by a compartment wall 43. Thus, the exhaust gas entered into the penetrating hole 41 of the honeycomb unit 31 from an opening at one end causes a contact with the mixed particles as it passes through the penetrating hole 41a, and with this, the toxic components (such as CO, HC, NOx, or the like) contained in the exhaust gas are converted. Further, the converted exhaust gas are discharged from the opening at the other end of the penetrating hole 41a.

While the honeycomb unit 31a contains the mixed particles according to the embodiment of the present invention, it is further preferable that the honeycomb unit 31a contains inorganic fibers and/or whiskers. With this, it becomes easier to improve the strength of the honeycomb unit 31a.

For the material of the inorganic fibers and/or whiskers, it is possible to use alumina, silica, silicon carbide, silica-alumina, glass, potassium titanate, aluminum borate, and the like, wherein two ore more of these may be used. Particularly, it is preferable to use whiskers of aluminum borate. In the specification of the present invention, inorganic fibers and/or whiskers are meant to indicate the material having an average aspect ratio (length/diameter) exceeding about 5, wherein it is preferable that the average aspect ratio is about 10 to about 1000.

Usually, the content of the mixed particles in the honeycomb unit 31a is about 30 wt % or more, preferably about 40 wt % or more, more preferably about 50 wt % or more. On the other hand, the content of the mixed particles in the honeycomb unit 31a is usually about 97 wt % or less, preferably about 90 wt % or less, more preferably about 80 wt % or less, still more preferably about 75 wt % or less.

Usually, the content of the mixed particles in the honeycomb unit 31a is about 3 wt % or more, preferably about 5 wt % or more, more preferably about 8 wt % or more. On the other hand, the content of the inorganic fiber and/or whisker in the honeycomb unit 31a is usually about 70 wt % or less, preferably about 50 wt % or less, more preferably about 40 wt % or less, still more preferably about 30 wt % or less.

Further, it is preferable that the honeycomb unit 31a is formed by using a raw material paste containing the mixed particles, the inorganic fibers and/or whiskers, and an inorganic binder. Thus, by using the raw material paste containing inorganic binder, it becomes easier to obtain the honeycomb unit 31a having a suitable strength while using low firing temperature.

For the inorganic binder, it is possible to use inorganic sols, clay binders, or the like. For the inorganic sols, it is possible to use alumina sol, silica sol, titania sol, water glass, or the like. For the clay binder, it is possible to use clay of double chain structure such as white clay, kaolin, montmorillonite, sepiolite, atapalgite, and the like. Particularly, it is possible to use alumina sol, silica sol, titania sol, water glass, sepiolite and atapalgite. Two or more inorganic binders may be used together.

In the raw material paste, the inorganic binder is added with a proportion of usually about 5 wt % or more with regard to the total weight of the mixed particles, the inorganic fibers and/or whiskers, and the inorganic binder, preferably about 10 wt % or more, and more preferably about 15 wt % or more. On the other hand, the raw material paste usually contains the inorganic binder with a proportion of about 50 wt % or less with regard to the total weight of the mixed particles, the inorganic fibers and/or whiskers, and the inorganic binder, preferably about 40 wt % or less, and more preferably about 35 wt % or less. When the content of the inorganic binder is about 5 wt % or more, there is a tendency that the strength of the honeycomb structure does not experience degradation, while when the content of the inorganic binder is 50 wt % or less, there is a tendency that the formability is less degraded.

While there is no limitation with regard to the thickness of the compartment wall 43 of the honeycomb unit 31a, it is preferable that the compartment wall 43 has a thickness of about 0.1 mm or more from the viewpoint of strength of the honeycomb unit 31a and the compartment wall 43 and that the compartment wall 43 has a thickness of about 0.4 mm or less from the viewpoint of gas conversion performance and characteristics.

The honeycomb structure according to the embodiment of the present invention may have a construction in which the honeycomb block is formed of a single honeycomb unit. Further, the outer periphery of the honeycomb block may not be cut. Further, it is sufficient that the coating layer is formed according to the needs and may be omitted for example in the case of the honeycomb block in which the outer periphery is not cut.

Next, a method of manufacturing the honeycomb structure according to an embodiment of the present invention will be explained.

First, a honeycomb unit molded body is obtained by carrying out a molding process such as extrusion molding process while using a raw material paste that contains therein the mixed particles according to the embodiment of the present invention, inorganic fibers and/or whiskers, and an inorganic binder.

In addition, the raw material paste may contain an organic binder, dispersing medium, forming additives, and the like, by taking into consideration the easiness of the molding process. While not limited, it is possible to use methyl cellulose, carboxymethyl cellulose, hydroxyethyl cellulose, polyethylene glycol, and the like, for the organic binder, wherein two or more of these may also be used. Preferably, the organic binder is contained in the raw material paste with a proportion of about 1 to about 10 wt % with regard to the total of the mixed particles, inorganic fibers and/or whiskers and the inorganic binder. While not limited, it is possible to use water, organic solvent such as benzene, alcohol (methanol, or the like), for example, for the dispersing medium. While not limited, it is possible to use ethylene glycol, dextrin, aliphatic acid, soap of aliphatic acid, polyalcohol, and the like, for example, for the forming additives.

While not limited, it is preferable to mix and knead the raw material paste. For example, mixing may be made by using mixer, attritor, or the like, and thorough kneading may be made by using kneader, or the like.

Next, it is preferable to dry the honeycomb unit molded body. While not limited, the dryer used for the drying may be any of microwave dryer, hot air dryer, dielectric dryer, depressurizing dryer, vacuum dryer, freeze dryer, and the like.

Further, it is preferable to degrease the dried honeycomb unit molded body. The condition of the degreasing is not limited and may be chosen according to the kind and amount of the organic substances contained in the honeycomb unit molded body. Generally, the degreasing may be conducted at about 400° C. for about 2 hours.

Further, it is preferable to fire the degreased honeycomb unit molded body. While not limited to the following parameters, the firing may be conducted preferably under the condition of about 600 to about 1200° C., more preferably about 600 to about 1000° C.

With this, the honeycomb unit 31a is obtained.

Next, an adhesive layer paste is coated upon the outer periphery of the honeycomb unit 31a with uniform thickness and the honeycomb unit 31a is attached to another honeycomb unit 31a by interposing the adhesive layer paste. By repeating the foregoing process, it is possible to obtain the assembly of the honeycomb units. Thereby, the number of the honeycomb units 31a may be chosen appropriately according to the size of the honeycomb structure 30 to be manufactured.

While not limited, it is possible to use a mixture of inorganic binder and ceramic particles, a mixture of inorganic binder and inorganic fibers, a mixture of inorganic binder, ceramic particles and inorganic fibers, or the like, for example, for the adhesive layer paste. Further, the adhesive layer paste may contain an organic binder. While not limited to the following, it is possible to use polyvinyl alcohol, methyl cellulose, ethyl cellulose, carboxymethyl cellulose, and the like, for the organic binder, wherein two or more of these may also be used.

Next, the assembly of the honeycomb units is heated such that the adhesive layer paste is dried and solidified. With this, the adhesive layer 31b is formed so as to bind the honeycomb units 31a with each other. The adhesive layer 31b may have a thickness of about 0.3 to about 2 mm. When the thickness of the adhesive layer 31b is equal to or more than about 0.3 mm, it becomes easier to attain sufficient junction strength. When the thickness is equal to or less than about 2 mm, on the other hand, there is a tendency that the function of converting the exhaust gas is not degraded. Further, when the thickness of the adhesive layer 31b is equal to or less than about 2 mm, the tendency of increase of pressure loss is reduced.

Next, the assembly of the honeycomb units is cut for example in the form of a cylindrical shape by using a diamond cutter, or the like, and with this, the honeycomb block 31 of cylindrical shape is obtained. For example, it is also possible to form the honeycomb block 31 of the cylindrical shape by joining the honeycomb units 31a formed to have a cross-section of fan-shape or rectangular shape. With this, it is possible to omit the process of cutting.

Next, a coating layer paste is applied to the outer periphery of the honeycomb block 31. By drying and solidifying the coating layer paste, there is formed a coating layer 32, and with this, the honeycomb structure 30 is obtained. While the material constituting the coating layer paste is not limited, the material may be the same material constituting the adhesive layer paste. Alternatively, a different material may be used. Further, in the case the coating layer paste and the adhesive layer paste are formed from the same material, the ratio of the constituent materials may be set identical or may be set different. There is no specific limitation with regard to the thickness of the coating layer 32.

Preferably, the honeycomb block 31 or the honeycomb block thus formed with the coating layer 32 may be subjected to calcination. With this, it is possible to achieve degreasing in the case the adhesive layer paste or the coating layer paste contains organic binder. While the condition of the calcination process may be chosen appropriately according to the kind and amount of the organic binder, it is generally preferable to carry out the calcination process at about 700° C. for about 2 hours.

Further, it is possible to cause the honeycomb structure 30 to support a catalyst. While not specifically limited, it is possible to use alkali metals, alkali earth metals, oxides, or the like, for the catalyst. For the alkali metals, it is possible to use any of potassium, sodium, and the like. For the alkali earth metals, it is possible to use barium, or the like. For the oxides, it is possible to use perovskite ($La_{0.75}K_{0.25}MnO_3$), or the like. Thereby, two or more catalysts may be used together.

In the embodiment of the present invention, it is also possible to cause the compartment wall separating the holes in the honeycomb structure to support the mixed particles, in place of adding the mixed particles into the raw material paste.

While not limited to the following, the honeycomb structure 30 may be used for the exhaust gas converting apparatus of vehicles. In the exhaust gas converting apparatus, the honeycomb structure of the embodiment of the present invention is accommodated into a metal container in the state a seal material is disposed on the outer periphery of the honeycomb structure.

EXAMPLES

Examples 1 to 4

100 weight parts of $CeO_2$ particles (secondary particle; average particle diameter 0.3 μm) were added with 500 weight parts of water and the $CeO_2$ particles were caused to support a predetermined amount of Pt (see Table 2) by using a solution of dinitroamine platinum. Next, a drying process was conducted at 100° C., and Pt—$CeO_2$ particles were obtained by conducting a fixing process under the reducing atmosphere of 600° C. Further, the Pt—$CeO_2$ particles of a predetermined amount (see Table 2) and γ-Al2O3 particles (secondary particle; average particle diameter 0.7 μm) of a predetermined amount (see Table 2) were mixed thoroughly, and with this, mixed particles of average particle diameter of 2 μm were obtained. Table 2 shows the specific surface area of the obtained mixed particles in the state a durability test was conducted at 850° C. for 5 hours.

Comparative Example 1

Mixed particles were obtained by mixing 78.64 weight parts of $CeO_2$ particles (secondary particle; average particle diameter 0.3 μm), which correspond to 81 weight parts of the Pt—$CeO_2$ particles of Example 1, with 216 weight parts of γ-$Al_2O_3$ particles (secondary particle; average particle diameter 0.7 μm). Next, 500 weight parts of water were added to 100 weight parts of the mixed particles, and thereafter, the mixed particles were caused to support Pt of the proportion of 2 wt % with regard to the $CeO_2$ particles while using a solution of dinitroamine platinum. Further, drying was made at 100° C., followed by fixing at 600° C. under a reducing atmosphere. With this, mixed particles of average diameter of 2 μm were obtained. Table 2 shows the specific surface area of the obtained mixed particles in the state a durability test was conducted at 850° C. for 5 hours.

TABLE 2

| | Pt weight ratio (%) to $CeO_2$ particles | Adding amount of Pt—$CeO_2$ particles (weight part) | Adding amount of $Al_2O_3$ particles (weight part) | Pt specific surface area after durability test [$m^2/g$] |
|---|---|---|---|---|
| Example 1 | 3 | 81 | 216 | 0.75 |
| Example 2 | 5 | 48 | 232 | 0.68 |
| Example 3 | 10 | 23 | 244 | 0.60 |
| Example 4 | 0.9 | 266 | 127 | 0.70 |
| Comparative Example 1 | 3 | — | 216 | 0.02 |

Here, the specific surface area was measured by BET-CO absorbing method while taking into consideration the oxygen storage capacity (OSC capacity) of $CeO_2$. From Table 2, it can be seen that the mixed particles of Examples 1 to 4 have larger specific surface area of Pt after the durability test as compared with the mixed particles of Comparative Example 1, indicating that sintering of Pt is suppressed.

Examples 5 to 8

100 weight parts of $CeO_2$ particles (secondary particle; average particle diameter 5 μm) were added with 500 weight parts of water and the $CeO_2$ particles were caused to support a predetermined amount of Pt (see Table 3). Next, a drying process was conducted at 100° C., and Pt—$CeO_2$ particles were obtained by conducting a fixing process under the reducing atmosphere of 600° C. Further, a predetermined amount (see Table 2) of the Pt—$CeO_2$ particles were added to water of sufficient amount together with polycarboxylic acid ammonium (suitable amount) used for dispersing agent. Thereby, the Pt—$CeO_2$ particles were dispersed by adjusting the pH to 9 by using ammonia. Further, particles of γ-$Al_2O_3$ (secondary particle; average particle diameter 2 μm) were added to the dispersion liquid of the Pt—$CeO_2$ particles with a predetermined amount (see Table 3) and dispersion was made therein until primary particles of γ-$Al_2O_3$ are obtained. Further, the dispersion liquid thus obtained was atomized by using a spray dryer, and mixed particles of average particle diameter of 2 μm were obtained. Table 3 shows the specific surface area of the obtained mixed particles in the state a durability test was conducted at 850° C. for 5 hours.

Comparative Example 2

78.64 weight parts of $CeO_2$ particles (secondary particle; average particle diameter 5 μm), which correspond to 81 weight parts of the Pt—$CeO_2$ particles of Example 5, were added into sufficient amount of water together with polycarboxylic ammonium (suitable amount) acting as dispersing agent and dispersed by adjusting the pH to 9. Further, 216 weight parts of particles of γ-$Al_2O_3$ (secondary particle; average particle diameter 2 μm) were added to the dispersion liquid of the Pt—$CeO_2$ particles and dispersion was made therein until primary particles of γ-$Al_2O_3$ are obtained. Further, the obtained dispersion liquid was atomized by using a spray dryer, and mixed particles were obtained. Next, 500 weight parts of water were added to 100 weight parts of the mixed particles, and thereafter, the mixed particles were caused to support Pt of the proportion of 2 wt % with regard to the $CeO_2$ particles while using a solution of dinitroamine platinum. Further, drying was made at 100° C., followed by fixing at 600° C. under a reducing atmosphere. With this, mixed particles of average diameter of 2 μm were obtained. Table 3 shows the specific surface area of the obtained mixed particles in the state a durability test was conducted at 850° C. for 5 hours.

Comparative Example 3

100 weight parts of γ-$Al_2O_3$ particles (secondary particle; average particle diameter 2 μm) were added with water of 500 weight parts and the γ-$Al_2O_3$ particles were caused to support Pt with the proportion of 3 wt % with regard to the γ-$Al_2O_3$ particles by using dinitroamine platinum solution Further, drying was made at 100° C., followed by fixing at 600° C. under a reducing atmosphere. With this, particles of average diameter of 2 μm were obtained. Table 3 shows the specific surface area of the obtained particles in the state a durability test was conducted at 850° C. for 5 hours.

TABLE 3

|  | Pt weight ratio (%) to CeO$_2$ particles | Adding amount of Pt—CeO$_2$ particles (weight part) | Adding amount of Al$_2$O$_3$ particles (weight part) | Pt specific surface area after durability test [m$^2$/g] |
| --- | --- | --- | --- | --- |
| Example 5 | 3 | 81 | 216 | 0.80 |
| Example 6 | 5 | 48 | 232 | 0.75 |
| Example 7 | 10 | 23 | 244 | 0.67 |
| Example 8 | 0.9 | 266 | 127 | 0.71 |
| Comparative Example 2 | 3 | — | 216 | 0.02 |
| Comparative Example 3 | — | — | 100 | 0.005 |

From Table 3, it can be seen that the mixed particles of Examples 5 to 8 have larger specific surface area of Pt after the durability test as compared with the mixed particles of Comparative Example 2 or the particles of Comparative Example 3, indicating that sintering of Pt is suppressed.

While the present invention has been explained for preferred embodiments, the present invention is not limited to such specific embodiments. Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A mixed particle comprising:
   noble metal particles of a noble metal;
   first particles of one or more metal oxides selected from a group consisting of Al$_2$O$_3$, SiO$_2$, ZrO$_2$ and TiO$_2$; and
   second particles of a metal oxide having a larger adsorptive interaction with said noble metal of said noble metal particles as compared with said metal oxide of the first particles,
   wherein said noble metal particles are carried by said second particles in a larger proportion than by said first particles,
   wherein said mixed particle has an average particle diameter of about 1 to about 5 μm,
   wherein said first particles and said second particles are both secondary particles, and
   wherein said first particles have an average particle diameter larger than an average particle diameter of said second particles, said average particle diameter of said first particles being about 0.5 to about 2 μm, said average particle diameter of said second particles being about 0.1 to about 1 μm.

2. The mixed particle as claimed in claim 1, wherein said first particles comprise Al$_2$O$_3$ and said second particles comprise CeO$_2$.

3. The mixed particle as claimed in claim 1, wherein said noble metal particles comprise Pt.

4. The mixed particle as claimed in claim 1, wherein a weight ratio of said second particles to said first particles is about 0.05 to about 3.0.

5. A honeycomb structure comprising:
   a plurality of cells having a hole therein, said plurality of cells being arranged side by side in a longitudinal direction thereof; and
   a plurality of mixed particles supported by said plurality of cells, each mixed particle of said plurality of mixed particles including:
   noble metal particles of a noble metal;
   first particles of one or more metal oxides selected from a group consisting of Al$_2$O$_3$, SiO$_2$, ZrO$_2$ and TiO$_2$; and
   second particles of a metal oxide having a larger adsorptive interaction with said noble metal as compared with said metal oxide of said first particles,
   wherein said noble metal particles are supported by said second particles in a larger proportion than by said first particles,
   wherein said mixed particle has an average particle diameter of about 1 to about 5 μm, and
   wherein said first particles have an average particle diameter larger than an average particle diameter of said second particles, said average particle diameter of said first particles being about 0.5 to about 2 μm, said average particle diameter of said second particles being about 0.1 to about 1 μm.

6. The honeycomb structure as claimed in claim 5, wherein said mixed particles are supported by a compartment wall separating holes of adjacent cells of said plural cells.

7. The honeycomb structure as claimed in claim 5, wherein said mixed particles are added to a raw material paste.

8. The honeycomb structure as claimed in claim 5, further comprising a catalyst supported by said plural cells, said catalyst comprising any of an alkali metal, an alkali earth metal and an oxide.

9. The honeycomb structure as claimed in claim 5, wherein said first particles and said second particles are both secondary particles.

10. The honeycomb structure as claimed in claim 5, wherein said first particles comprise Al$_2$O$_3$ and said second particles comprise CeO$_2$.

11. The honeycomb structure as claimed in claim 5, wherein said noble metal particles comprise Pt.

12. The honeycomb structure as claimed in claim 5, wherein a weight ratio of said second particles to said first particles is about 0.05 to about 3.0.

13. The honeycomb structure as claimed in claim 5, wherein said honeycomb structure includes a plurality of honeycomb units joined with each other by interposing an adhesive layer, and wherein each honeycomb unit of said plural honeycomb units is produced by using a raw material paste containing said mixed particles, inorganic fibers and/or whiskers, and an inorganic binder.

14. The honeycomb structure as claimed in claim 13, wherein said inorganic fibers and/or whiskers comprise: alumina; silica; silicon carbide; silica-alumina; glass; potassium titanate; or aluminum borate.

15. The honeycomb structure as claimed in claim 13, wherein said inorganic binder comprises an inorganic sol or a clay binder.

16. The honeycomb structure as claimed in claim 15, wherein said inorganic binder comprises any of alumina sol, a silica sol, a titania sol, water glass, sepiolite, or atapalgite.

* * * * *